United States Patent [19]

Marron

[11] Patent Number: 5,030,041
[45] Date of Patent: Jul. 9, 1991

[54] COMPACT BORING SYSTEM

[75] Inventor: Gerald I. Marron, Marple Township, Delaware County, Pa.

[73] Assignee: Westinghouse Electric Corp., Pittsburgh, Pa.

[21] Appl. No.: 505,753

[22] Filed: Apr. 6, 1990

[51] Int. Cl.$^5$ ............................................. B23B 41/00
[52] U.S. Cl. .................................... 408/83.5; 408/80; 408/181; 408/111; 408/233; 51/241 VS; 82/1.4
[58] Field of Search .................................... 408/79-83, 408/131, 111, 54, 55, 83.5, 138, 137, 181, 182, 183, 185, 233; 51/170 R, 261, 43, 290, 241 A, 241 VS, 227 A; 29/33 T; 409/143; 82/1.2, 1.4; 166/55.6, 55.7, 55.8

[56] References Cited

U.S. PATENT DOCUMENTS

| | | | |
|---|---|---|---|
| 413,697 | 10/1889 | Wheelock | 82/1.4 |
| 865,533 | 9/1907 | Rowe | 408/82 X |
| 4,359,917 | 11/1982 | Wilger et al. | 82/1.4 X |
| 4,668,133 | 5/1987 | Campbell et al. | 408/81 |
| 4,678,379 | 7/1987 | Sunday | 408/83.5 |
| 4,824,296 | 4/1989 | Strait | 408/83 X |

FOREIGN PATENT DOCUMENTS

| | | | |
|---|---|---|---|
| 157821 | 1/1953 | Australia | 408/82 |
| 2353242 | 4/1975 | Fed. Rep. of Germany | 408/82 |

*Primary Examiner*—Larry I. Schwartz
*Assistant Examiner*—Robert Schultz
*Attorney, Agent, or Firm*—Michael G. Panian

[57] ABSTRACT

A compact boring system 20 for machining the interior surface of cylindrical shapes, such as steam turbine valves and rotors in a field situation. The apparatus is designed to set up in the object itself. A boring bar 26 is rotatably disposed in a pair of roller bearing supports 23. A plurality of locating buttons 29 extend radially from the bearing supports 23 to contact the interior of the object and support the apparatus therein. The bearing supports 23 can be secured to the boring bar 26 at any axial location thereon. A machining head 35 is also securable to the boring bar 26 at any axial location, and includes a threaded drive shaft 38 for translating the machining head 35 axially along the bar 26. A cutting tool 56 is disposed in the machining head 35 so as to be radially adjustable with respect to the axis of the bar. A rotary drive-system 153 for rotating the bar 26, and thus the machining head 35, within the bearing supports 23 is provided, the rotary drive also being mountable anywhere along the length of the boring bar.

23 Claims, 5 Drawing Sheets

COMPACT BORING SYSTEM

TECHNICAL FIELD

The invention relates to an apparatus for machining the interior of cylindrical objects, and more particularly to a compact boring system for boring and facing valves and cylinders in a field situation.

BACKGROUND OF THE INVENTION

When machining cylindrical components, such as the valves of a steam turbine, in a field situation, several factors become important such as ease of set-up, adjacent equipment, rigidity of set-up, and ease of use. Previously, a fixed machine which sits on a platform mounted outside the valve extended into the valve for machining purposes. Although quite suitable for its intended purpose, this has several drawbacks, such as the need for a rigid platform in front of the valve to support a large bulky machine, as well as possible interference with adjacent machinery, and difficulty of set-up.

A tool which can mount within the valve or other cylindrical member is advantageous. U.S. Pat. No. 4,678,379 issued on July 7, 1987, to Sunday, which patent is assigned to the present assignee and incorporated herein by reference, discloses an apparatus for machining a valve seat. The apparatus is designed to machine a stop valve seat ring while the valve is still connected to the turbine. A pair of spiders with adjustable arms fit within the valve and cooperate with a shaft rotatably supported therein. A motor is attached to one of the spiders, the shaft including a tool support which holds and is capable of moving a single-edge cutting tool axially to machine the seat ring. While this device can satisfactorily machine a valve seat ring, it has a limited-use potential. A multi-purpose machine for boring and facing valves and cylinders, having versatility and ease of use, is desired. Moreover, a device which can be inserted within cylinders and valves encompassing a wide range of diameters would be advantageous.

DISCLOSURE OF THE INVENTION

It is an object of the present invention to provide a compact boring system for boring and facing valves and cylinders in a field-use situation.

It is another object of the present invention to provide such a device which can be axially and radially positioned within the cylindrical object to be machined.

It is another object of the present invention to provide a boring and facing apparatus which precludes the possibility of interference with adjacent machinery.

The above objects are obtained by the present invention, according to which, briefly stated, an apparatus for machining a generally cylindrical object comprises a bar having slot axially extending along its length, the bar being rotatably disposed in a pair of bearing supports. The bearing supports have a plurality of locating buttons radially extending therefrom to affix the bearing supports to an inner wall of the cylindrical object, such as a steam turbine valve. The bearing supports are adapted to be rotatably secured to the bar at any location thereon. A means for rotating the bar within the bearing supports is provided, to thereby rotate a machining head adapted to be secured to the bar at any axial location thereon, such that the machining head is rotatable with the bar. Means for translating the machining head axially along the bar is provided as well as means for holding a cutting tool disposed on the machine head, such that the cutting tool is radially adjustable with respect to the axis of the bar.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENTS

Figure 1:
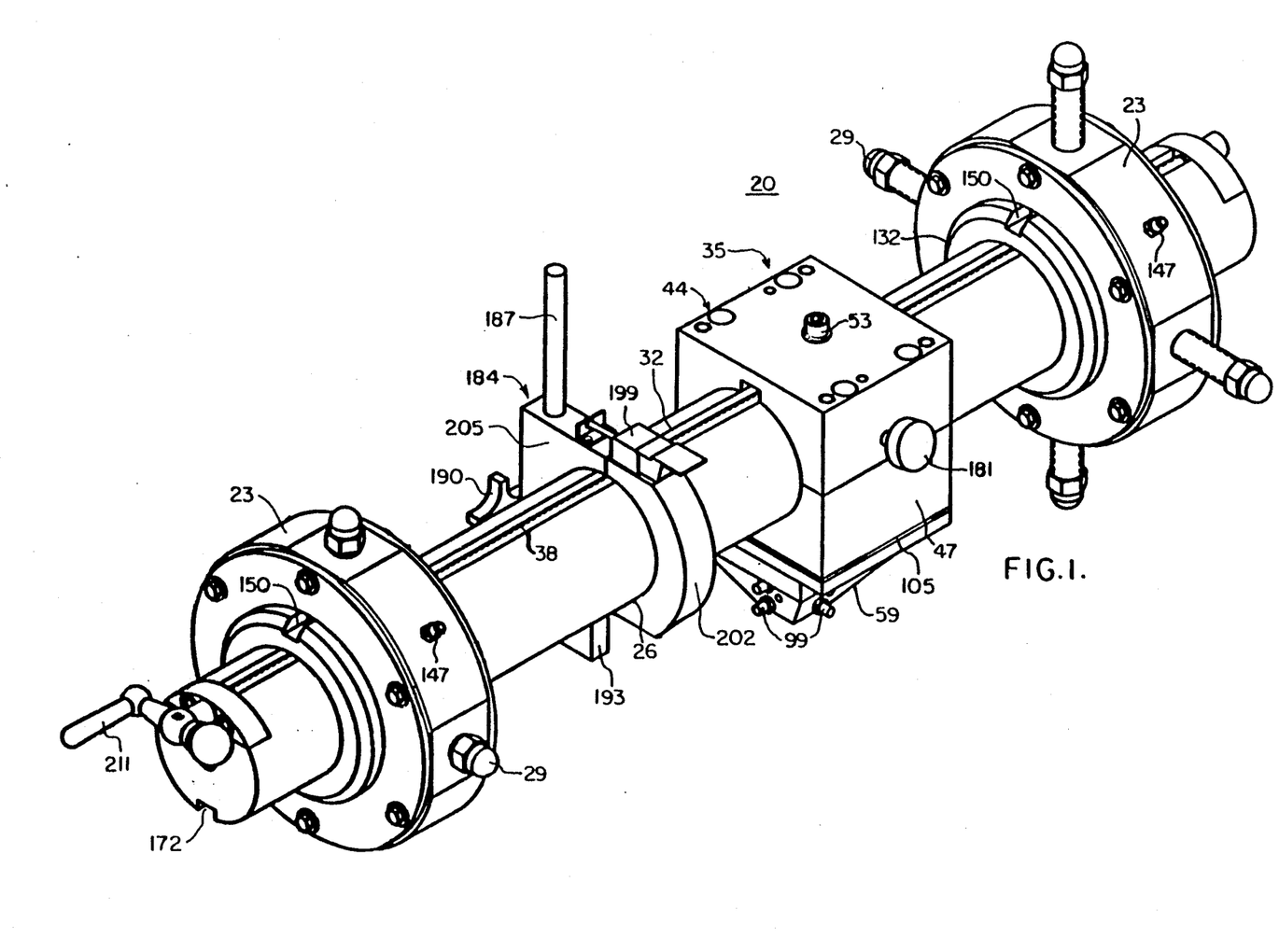
FIG. 1 shows the compact boring system of the present invention.

Referring now to the drawings in detail, FIG. 1 shows a compact boring system 20 of the present invention. A pair of bearing supports 23 are rotatably secured to a boring bar 26, so as to be secured at any axial location along the boring bar 26. A plurality of locating buttons 29 radially extend from each of the bearing supports 23. These locating buttons 29 are threadingly secured within the bearing supports 23, and preferably are of varying sizes. This allows the device to be mounted in cylindrical objects, such as turbine valves and rotors within a wide range of diameters. The bar 26 has at least one slot 32 extending axially along its length. A machining head 35 is also secured to the boring bar 26. Although it is shown disposed between the two bearing supports 23, as will be described in more detail hereinafter, the machining head 35 can be disposed at any axial location along the boring bar 26, such as on either end thereof. Disposed within the slot 32 is a threaded drive shaft, or lead screw, 38 which engages a lead nut 41 within the machining head 35 for translating the machining head axially along the bar 26.

Figure 2:
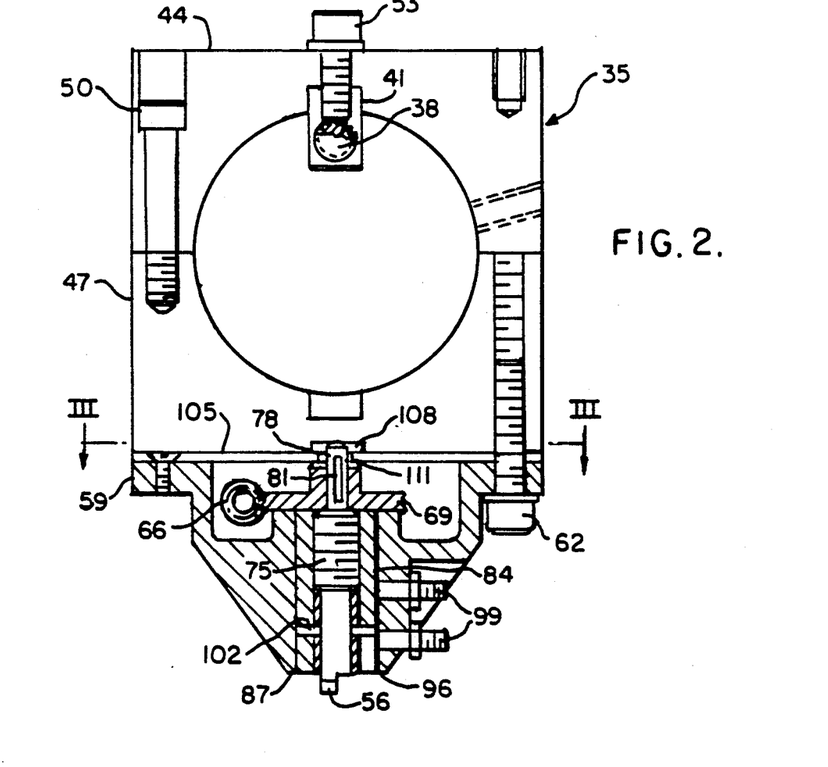
FIG. 2 is a cross-sectional view of a machining head for the present invention.
Figure 3:
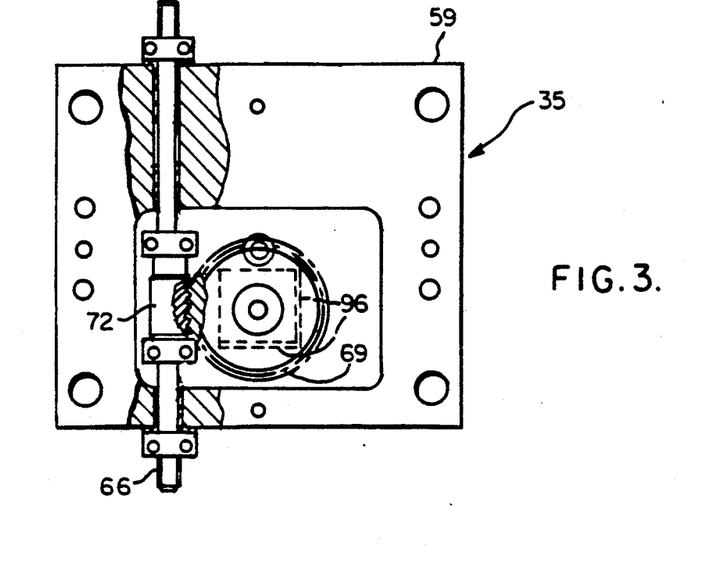
FIG. 3 is a view taken along the lines III—III of FIG. 2.

Referring now to FIGS. 2 and 3, the machining head 35 of the compact boring system 20 will be described in more detail. FIG. 2 is a cross-sectional view of the machining head 35. A first, or top, clamp half 44 is secured to a second, or bottom, clamp half 47, such as by bolting 50. The lead nut 41 is secured to the top clamp 44, also by a bolt 53. Secured to the bottom clamp 47 is a means for holding a cutting tool 56. The cutting tool holder comprises a housing 59 secured to the bottom clamp half 47, preferably by bolts 62. A drive shaft 66 is rotatably disposed within the housing 59 and is threadingly engaged with a worm gear 69 by a worm drive 72. This worm gear 69 is in turn operably associated with a feed screw 75 extending radially with respect to the bar 26. The feed screw 75 is secured to the worm gear 69 by a pin 78 which rides in a slot 81 on one end of the feed screw 75 and is rotatable therewith. The opposite end of the feed screw 75 has an external thread 84 which is threadingly coupled to a tool holder 87. A connecting portion 90 of the tool holder 87 has a bore 93 which is threadingly associated with the threaded portion 84 on the one end of the feed screw 75. The tool holder 87 is mounted within the housing 59, and includes a pair of gib flats 96 mounted between the housing 59 and the tool holder 87 so as to provide a bearing surface therefor. The gib flats 96 are held within the housing 59 by means of screws 99. The cutting tool 56 is held within the tool holder 87 such as by a set screw 102.

As the drive shaft 66 is rotated, the worm gear 69 is thus rotated to rotate the feed screw 75 mounted within the housing 59. As the worm gear 69 is rotated, the feed screw 75 is rotated therewith, whereby the tool holder 87 is radially adjusted with respect to the axis of the boring bar 26 by the threaded engagement between the feed screw 75 and the tool holder 87. A cover plate 105 is also disposed between the housing 59 and the bottom clamp 47, the feed screw 75 being secured to the cover plate 105 by a retaining ring 108 and bearing 111.

Figure 4A:
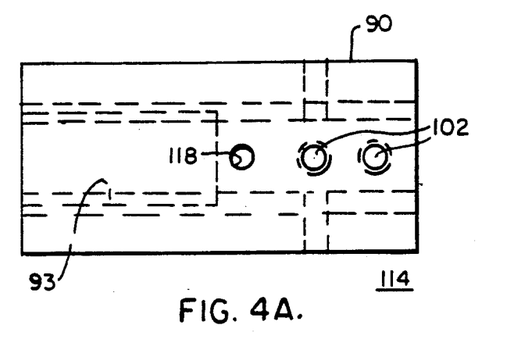
FIGS. 4A and 4B are detailed views of a first tool holder for the machining head.
Figure 4B:
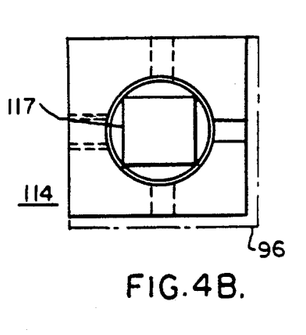
Figure 5A:
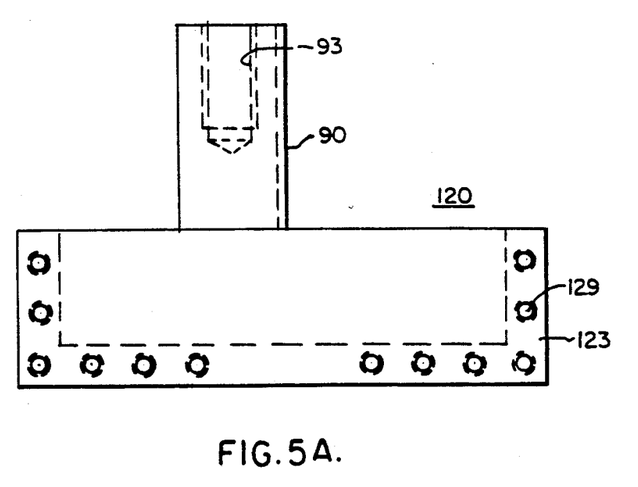
FIGS. 5A and 5B are detailed views of a second tool holder for the present invention.
Figure 5B:
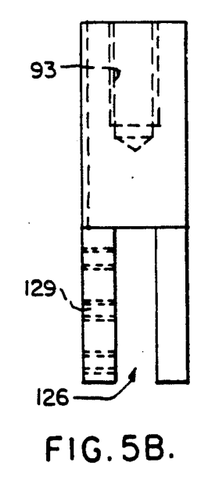

FIGS. 4 and 5 show detailed views of differing tool holders for the present invention. FIGS. 4A and 4B show a square bar tool holder 114 for holding a small square cutting tool 56 which is designed to fit in valves having a relatively small bore. Disposed within the square bar 114 is square-holed sleeve 117 for holding the cutting tool 56, the sleeve being pinned 118 to the square bar tool holder 114, and the cutting tool itself being secured to the sleeve 117 by the set screw 102. A second tool holder 120 is shown in FIGS. 5A and 5B. This tool holder 120 is adapted to hold a cutting tool so as to extend therefrom either radially or axially with respect to the boring bar 26. The connecting portion 90 of the tool holder 120 has extending therefrom a pair of legs 123, thereby providing a channel 126 for placement of the cutting tool 56 therebetween. One leg includes a plurality of holes for receiving set screws 129 which hold the cutting tool. The cutting tool can be held anywhere along the length of the channel 126 so that, for example, the cutting tool 56 can extend outward from the end of the boring bar 26 for specialized machining operations such as at the end of the cylindrical object or valve. Preferably, the cutting tool 56 is held by at least three set screws 129 to rigidly secure the cutting tool within the tool holder 120. Thus the cutting tool 56 can be positioned so that machining can be performed in an axial, as well as radial, direction with respect to the machining head.

Figure 6:
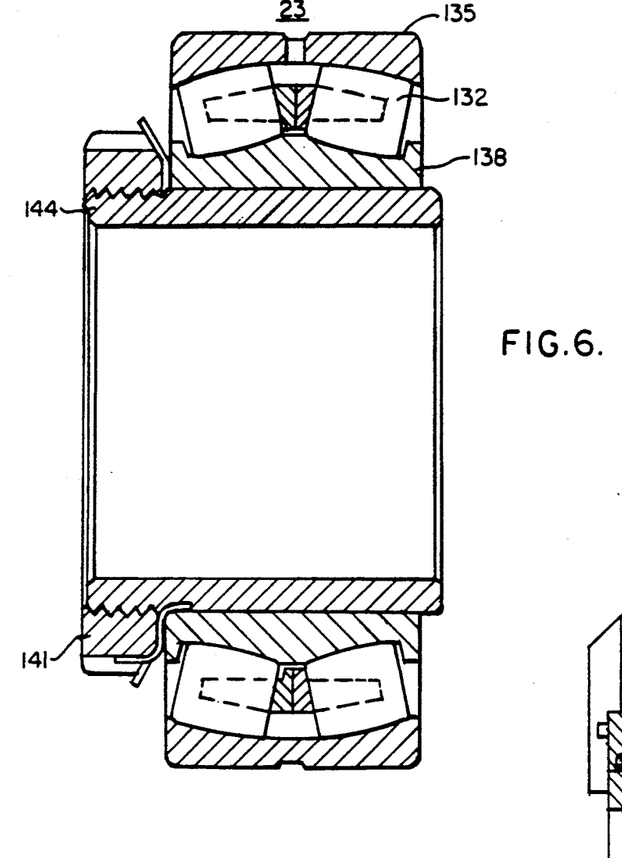
FIG. 6 is a detailed view of a spherical roller bearing assembly for the bearing support of the present invention.

Referring now to FIG. 6, a detailed view in cross section of a spherical roller bearing assembly 132 for the bearing support 23 is shown. Spherical roller bearings 132 having an outer 135 and inner 138 race are secured to the boring bar 26 by a lock nut 141 and tapered sleeve 144 arrangement. After the bearing support assembly is slipped onto the boring bar 26, the lock nut 141 is tightened so as to draw the tapered, collapsible sleeve 144 into the inner race 138, thus clamping the bearing assembly 132 onto the boring bar 26. Preferably, a grease fitting 147 is provided on each of the bearing supports 23 to provide lubrication for the roller bearings 132. As is more readily shown in FIG. 1, the roller bearing assembly 132 includes a slot 150 so as to allow for a wrench (not shown) to be inserted therein so as to tighten the lock nut 141. In this manner, the bearing supports 23 are secured the boring bar 26 at any axial location; i.e., rigidly within the valve or other cylindrical object to be machined as the boring bar 26 is rotated with the machining head 35.

Figure 7:
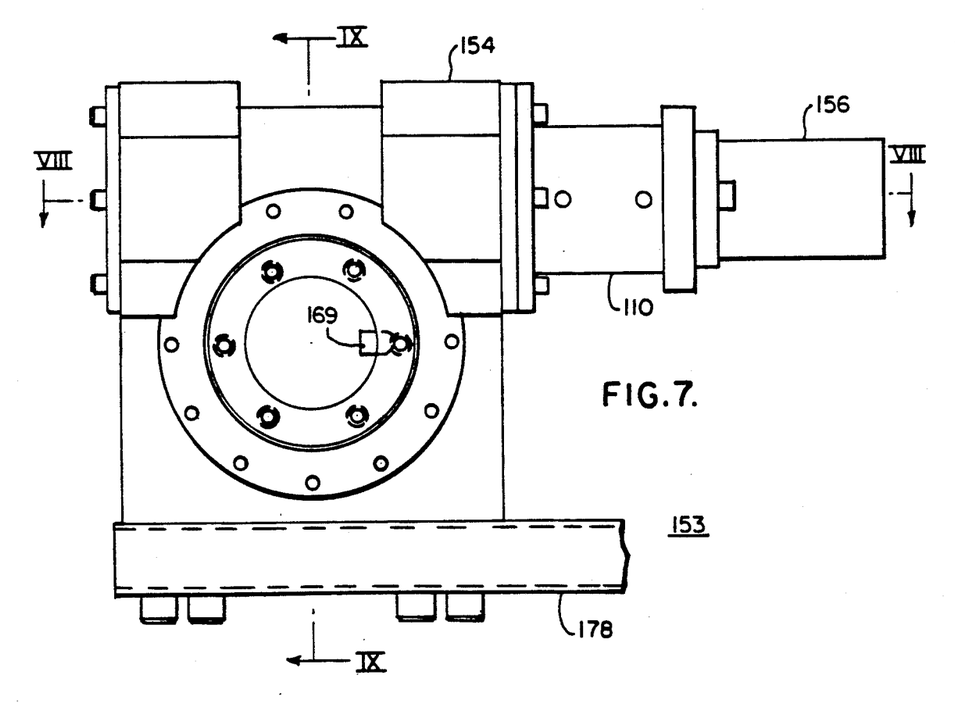
FIG. 7 shows a drive system for the compact boring system of the present invention.
Figure 8:
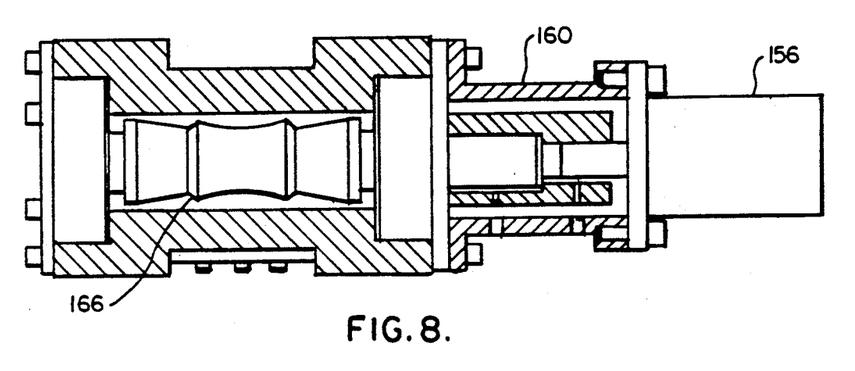
FIG. 8 is a view taken along the lines VIII—VIII of FIG. 7.
Figure 9:
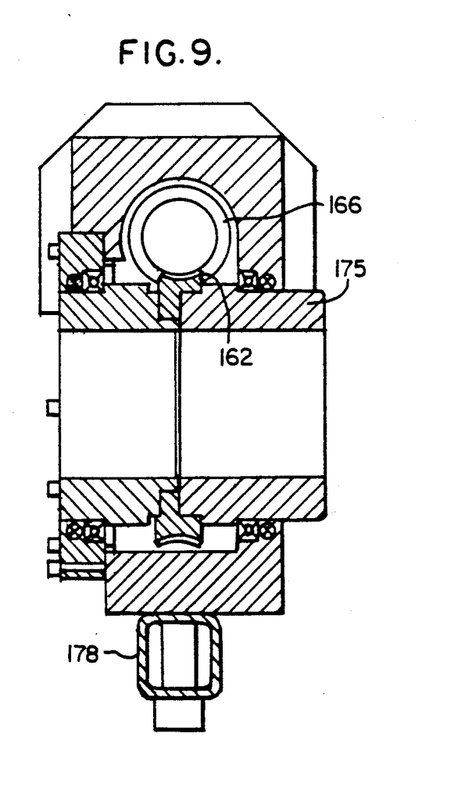
FIG. 9 is a view taken along the lines IX—IX of FIG. 7.

Referring now to FIGS. 7-9, a rotary drive system 153 for the compact boring system 20 will now be described in detail. This specially designed worm gear drive system 153 can also be mounted anywhere along the bar 26. A motor 156 is secured to the drive system housing 159 through an adaptor 160 and operates a worm gear 162 through a conical drive 166. The worm drive system is connected to the boring bar 26 by a key 169 which is inserted into a second axial slot 172 on the boring bar 26. The worm gear 162 rotates a flange 175 whereby rotation of the worm gear 162 by the motor 156 causes a corresponding rotation of the boring bar 26. A reaction arm 178 is secured to the housing 159 opposite the conical drive 166 so as to provide a counter-rotation force to prevent the drive system 153 from turning within the valve.

In order to extend the effective machining diameter of the device 20, spacer plates (not shown) may be disposed between the housing 59 and the bottom clamp 47. The spacer plates can be in a variety of thicknesses to accommodate a wide range of diameters of cylindrical objects, much in the same as the locating buttons 29 do for the bearing supports 23. Preferably, a swivel screw 181 is provided within the top clamp half 44 for additional securement of machining head 35 to the boring bar 26.

Figure 10:
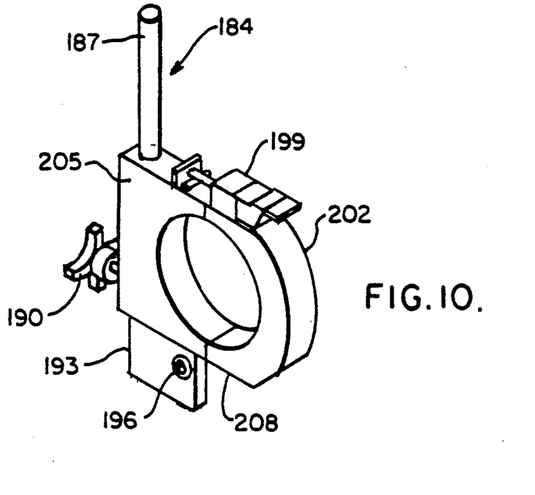
FIG. 10 shows a support arm for a telescoping shaft.

A support arm 184 (FIG. 10) can be provided to be mounted anywhere on the boring bar 26 to provide support for a telescoping shaft (not shown) which connects to the worm drive shaft 66 for radial adjustment of the cutting tool 56 from a remote location outside the cylindrical object. The support arm 184 includes a shaft 187 which is generally radially adjustable with respect to the boring bar 26 by means of a gear arrangement (not shown) operated by a knob 190. As the knob 190 is turned, the shaft 187 can be extended or retracted radially with respect to the boring bar 26 to thereby adjust support block 193. The support block includes a bushing 196 for rotatably receiving the telescoping shaft. This radial adjustment for the support block 193 accommodates for whatever diameter the machining head 35 is set to machine, such as the use of spacer plates discussed above, to align the bushing 196 with the drive shaft 66. The support arm 184 is easily securable to the boring bar 26 by a clamp assembly 199. When the clamp 199 is released, one end 202 of the support arm, which is secured to the other 205 by a hinge 208, can be rotated so as to "open up" the support arm 184. In the open position, the support arm is easily mounted on the boring bar 26 and then closed and clamped in position.

The machining head 35, and thus the cutting tool 56 is easily translated in a radial direction with respect to the bar 26 by the worm/feed screw arrangement within the housing 59. As the worm gear 69 is rotated by the drive shaft 66 which extends through the side of the machining head 35, radial feed is thus provided in a very small space that does not restrict the ability of the machining head 35 to be moved along the bar 26. The drive shaft 66 can be fitted with an extension handle so as to project out of whatever object, such as a steam turbine valve, that is being machined to an operator. Alternatively, a drive motor can be secured to the drive shaft 66 end so as to be remotely operable. Moreover, the machining head 35 can be axially moved along the length of the bar 26 by the feed screw 75 mounted therein, without having to unclamp the machining head 35 from the boring bar 26. The drive screw 38 can be rotated by a crank handle 211 mounted on an end of the boring bar 26, rotation of the lead screw 38 causing the machining head 35 to be axially located with respect to the bar by means of the lead nut 41 riding thereon. A motor-operated drive system may also be provided for the lead screw 38 for remote operation of it as well.

The spherical roller bearings 132 on the compact boring system 20 provide an advantage in that slight misalignment of the bearing supports 23 can be accommodated without pinching the bar 26 within the bearings, and thus the device does not have to be axially aligned with respect to the valve. Since the bearing supports 23 can be mounted anywhere along the axial length of the boring bar 26, the boring bar can be readily secured anywhere within the valve since the bearing supports 23 can be moved to any location so as to provide a locking arrangement along its length.

The adjustable locating buttons 29 of the bearing supports 23, which are provided in several different sizes, enable the apparatus of the present invention to be mounted in cylindrical objects having bores encompassing a range of diameters. The radial feed provided for the cutting tool 56 is mounted within a small area of the housing 59, to allow the device to be mounted in relatively small-sized cylinders. Moreover, the machining head 35 can be axially translated without having to remove the device from the valve or other cylindrical object which is being machined. Additionally, since the drive system 153 is mounted on the boring bar 26 by a key 169 engaging the second slot within the bar, the drive system can be placed anywhere on the bar 26 after the apparatus 20 has been mounted. The compact boring system 20 of the present invention thus provides complete adjustability in both the axial and radial directions, allowing for greater versatility in use and set-up of the machine. Thus, machining of a steam turbine valve can be readily accomplished in a field situation.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting after the scope of the invention which is to be given the full breadth of the appended claims and in any and all equivalents thereof.

What is claimed is:

1. Apparatus for machining a generally cylindrical object, the apparatus comprising:
   a bar having a slot axially extending along its length, a pair of bearing supports having a means including a plurality of locating buttons radially extending therefrom to removably affix said bearing supports to an inner wall of the cylindrical object, the bar being rotatably disposed in said bearing supports, said bearing supports adapted to be rotatably secured to the bar at any location thereon;
   means for rotating the bar within said bearing supports, said rotating means being adapted to be secured to the bar at any axial location thereon;
   a machining head adapted to be secured to said bar at any axial location thereon such that the machining head is rotatable therewith;
   means for translating the machining head axially along the bar; and
   means for holding a cutting tool disposed on the machining head such that the cutting tool is radially adjustable with respect to the axis of the bar.

2. The apparatus as recited in claim 1, further comprising a spacer plate operably disposed between the cutting tool and the bar so as to further radially separate the cutting tool from the bar.

3. The apparatus as recited in claim 1, wherein the machining head comprises a first and second clamp half operably secured together, the first clamp half including means for engaging said means for axially translating the machining head, and said means for holding the cutting tool being secured to the second clamp half.

4. The apparatus as recited in claim 3, wherein said means for axially translating the machining head comprises a threaded shaft rotatably disposed within the slot, the first clamp half having a nut adapted to engage the threaded shaft, and means for rotating the threaded shaft whereby the machining head is translated axially along the bar as the threaded shaft is rotated.

5. The apparatus as recited in claim 3, wherein said means for holding the cutting tool comprises a housing secured to the second clamp half, a drive shaft rotatably disposed within the housing and having a worm engaged with a worm gear operably with a feed screw, means threadingly coupling the feed screw with the cutting tool whereby the cutting tool is radially adjusted with respect to the bar when the drive shaft is rotated.

6. The apparatus as recited in claim 5, wherein the means threadingly coupling the feed screw with the cutting tool is achieved by means of a tool holder having a bore threadingly associated with an external portion on one end of the feed screw, an opposite end of the feed screw being secured to the worm gear so as to be rotatable therewith, such that rotation of the drive shaft causes a corresponding rotation of the worm gear and the feed screw whereby the tool holder is translated radially with respect to the bar.

7. The apparatus as recited in claim 5, further comprising means for supporting a telescoping shaft for rotating the drive shaft from a remote location.

8. The apparatus as recited in claim 1, wherein said means for rotating the bar comprises:
   a second slot axially extending along the length of the bar;
   and a rotary drive system adapted to be secured to the bar at any axial location thereon, the drive system having a key which engages said second slot, the drive system further comprising a motor operably associated with a conical drive shaft, the conical drive being threadingly engaged with a second worm gear fastened about a flange which is adapted to be disposed about the bar, the flange having an aperture for receiving the key, whereby the rotary drive system is operably secured so as to rotate the bar within said bearing supports.

9. A compact boring system for machining an inner surface of a cylindrical object, the system comprising:
   a boring bar having a slot axially extending along its length, a pair of bearing supports, the boring bar being rotatably disposed in said pair of bearing supports, said bearing supports having a means including a plurality of locating buttons radially extending therefrom to affix said bearing supports to the inner surface, said bearing supports adapted to be rotatably secured to the boring bar at any location thereon;

a machining head adapted to be secured to the boring bar at any axial location thereon, the machining head including means for holding a cutting tool therein such that the cutting tool is radially adjustable with respect to the axis of the boring bar;

means for rotating the boring bar and the machining head thereon, said rotating means being adapted to be secured to the boring bar at any axial location thereon; and means for translating the machining head axially along the boring bar.

10. The compact boring system as recited in claim 9, wherein the machining head comprises top and bottom clamp halves operably secured together, the top clamp half including means for engaging said means for axially translating the machining head, and said means for holding the cutting tool being secured to the bottom clamp half.

11. The compact boring system as recited in claim 10, wherein said means for axially translating the machining head comprises a lead screw rotatably disposed within the slot, the top clamp half having a lead nut adapted to engage the lead screw, and means for rotating the lead screw whereby the machining head is translated axially along the boring bar as the lead screw is rotated.

12. The compact boring system as recited in claim 10, wherein said means for holding the cutting tool comprises a housing secured to the bottom clamp half, a tool holder disposed within the housing so as to be radially adjustable with respect thereto, and means for radially adjusting the tool holder.

13. The compact boring system as recited in claim 12, wherein said means for radially adjusting the tool holder comprises a drive shaft rotatably disposed within the housing and having a worm drive threadingly engaged with a worm gear operably associated with a feed screw, the feed screw being threadingly coupled with the tool holder whereby the cutting tool therein is radially adjusted with respect to the boring bar when the drive shaft is rotated.

14. The compact boring system as recited in claim 10, wherein said means for rotating the boring bar comprises:

a second slot axially extending along the length of the boring bar;

and a rotary drive system adapted to be secured to the boring bar at any axial location thereon, the drive system further comprising a motor operably associated with a conical drive shaft, the conical drive shaft being threadingly engaged with a second worm gear fastened about a cylindrical flange adapted to be disposed about the boring bar, the flange having an aperture for receiving a key such that said key couples the flange to the second slot in the boring bar, whereby the rotary drive system is secured to the boring bar so as to rotate the boring bar and the machining head thereon within said bearing supports.

15. The compact boring system as recited in claim 9, further comprising means for supporting a telescoping shaft for radially adjusting the tool holder at a location remote from the inner surface.

16. The compact boring system as recited in claim 13, wherein the tool holder comprises a square bar having a connecting portion on one end, the connecting portion having a threaded bore adapted to threadingly engage the feed screw, and the other end of the tool holder having an opening for receiving the cutting tool.

17. The compact boring system as recited in claim 13, wherein the tool holder comprises a connecting portion on one end, the connection portion having a threaded bore adapted to threadingly engage the feed screw, and the other end of the tool holder having a pair of legs projecting therefrom, said legs thereby defining a channel therebetween for receiving the cutting tool.

18. The compact boring system as recited in claim 17, wherein one of said legs of the tool holder has a plurality of holes therein, said holes being adapted to receive set screws for securing the cutting tool to the tool holder, such that the cutting tool is adjustable with respect to the machining head.

19. The boring system as recited in claim 9, wherein said locating buttons are of varying sizes such that said compact boring system is adaptable to be affixed to cylindrical objects of differing inside diameters.

20. A compact boring system for machining valves in a field situation, said compact boring system comprising:

a boring bar having a pair of slots axially extending along its length, a pair of bearing supports, the boring bar being rotatably disposed in the pair of bearing supports, the bearing supports having means including a plurality of adjustable locating buttons radially extending therefrom to mount said boring system within the valve, said bearing supports adapted to be rotatably secured to the boring bar at any location thereon;

a machining head adapted to be secured to the boring bar at any axial location thereon, the machining head including means for holding a cutting tool therein such that the cutting tool is radially adjustable with respect to the axis of the boring bar;

a lead screw rotatably disposed within one of said slots, the machining head having a lead nut adapted to engage the lead screw, and means for rotating the lead screw wherein the machining head is translated axially along the boring bar as the lead screw is rotated;

a housing secured to the machining head opposite the boring bar, and having means for radially adjusting the tool holder with respect to the boring bar comprising a drive shaft rotatably disposed within the housing and having a worm drive threadingly engaged with a worm gear operably associated with a feed screw, the feed screw being threadingly coupled with a tool holder whereby the cutting tool therein is radially adjusted with respect to the boring bar when the drive shaft is rotated; and a rotary drive system adapted to be secured to the boring bar at any axial location thereon, the drive system further comprising a motor operably associated with a conical drive shaft, the conical drive shaft being threadingly engaged with a second worm gear fastened about a cylindrical flange adapted to be disposed about the boring bar, the flange having an aperture for receiving a key such that said key couples the flange to the other of said slots in the boring bar, whereby the rotary drive system is secured to the boring bar so as to rotate the boring bar and the machining head thereon within said bearing supports.

21. The compact boring system as recited in claim 20, wherein the tool holder comprises a square bar having a connecting portion on one end, the connecting portion having a threaded bore adapted to threadingly engage the feed screw, and the other end of the tool holder having an opening for receiving the cutting tool.

22. The compact boring system as recited in claim 20, wherein the tool holder comprises a connecting portion on one end, the connection portion having a threaded bore adapted to threadingly engage the feed screw, and the other end of the tool holder having a pair of legs projecting therefrom, said legs thereby defining a channel therebetween for receiving the cutting tool, and at least one of said legs having a plurality of holes therein, said holes being adapted to receive set screws for securing the cutting tool to the tool holder, such that the cutting tool is adjustable with respect to the machining head.

23. The compact boring system as recited in claim 20, wherein said locating buttons are of varying sizes such that said compact boring system is adaptable to be affixed to valves of differing inside diameters.

* * * * *